(12) United States Patent
Slicker et al.

(10) Patent No.: US 7,011,288 B1
(45) Date of Patent: Mar. 14, 2006

(54) MICROELECTROMECHANICAL DEVICE WITH PERPENDICULAR MOTION

(75) Inventors: James Melvin Slicker, West Bloomfield, MI (US); Ananthakrishnan Surianarayanan, Lansdale, PA (US)

(73) Assignee: Microstar Technologies LLC, West Bloomfield, MI (US)

( * ) Notice: Subject to any disclaimer, the term of this patent is extended or adjusted under 35 U.S.C. 154(b) by 0 days.

(21) Appl. No.: 10/313,208

(22) Filed: Dec. 5, 2002

Related U.S. Application Data
(60) Provisional application No. 60/134,838, filed on Jan. 15, 2002, and provisional application No. 60/335,769, filed on Dec. 5, 2001.

(51) Int. Cl.
*F16K 31/02* (2006.01)

(52) U.S. Cl. ........................ 251/11; 251/129.06
(58) Field of Classification Search ............ 251/11, 251/129.06
See application file for complete search history.

(56) References Cited

U.S. PATENT DOCUMENTS

| | | | |
|---|---|---|---|
| 4,821,997 A | | 4/1989 | Zdeblick |
| 4,824,073 A | | 4/1989 | Zdeblick |
| 4,943,032 A | | 7/1990 | Zdeblick |
| 4,966,646 A | | 10/1990 | Zdeblick |
| 5,029,805 A | * | 7/1991 | Albarda et al. ........... 251/11 |
| 5,058,856 A | * | 10/1991 | Gordon et al. ........... 251/11 |
| 5,325,880 A | * | 7/1994 | Johnson et al. ........... 251/11 |
| 5,785,295 A | * | 7/1998 | Tsai .................. 251/11 |
| 5,865,417 A | | 2/1999 | Harris et al. |
| 5,909,078 A | | 6/1999 | Wood et al. |
| 5,944,816 A | | 8/1999 | Dutton et al. |
| 5,955,817 A | | 9/1999 | Dhuler et al. |
| 5,962,949 A | | 10/1999 | Dhuler et al. |
| 6,003,833 A | * | 12/1999 | Tasi et al. ............ 251/11 |
| 6,023,121 A | | 2/2000 | Dhuler et al. |
| 6,087,638 A | * | 7/2000 | Silverbrook ............ 251/11 |
| 6,367,251 B1 | | 4/2002 | Wood |
| 6,386,507 B1 | | 5/2002 | Dhuler et al. |
| 6,505,811 B1 | * | 1/2003 | Barron et al. .......... 251/129.01 |

OTHER PUBLICATIONS

Mankane, N., Compresive Thermal Modeling and Characterization of an Electro–Thermal–Compliant Microactuator, Journal of Micromechanics and Microengineering, 11, No. 5 (2001).

Moulton, T., Design and Manufacture of Electro–Thermal–Compliant Micro Devices, Sensors and Actuators, Physical, 90 (2001).

Moulton, T., Micromechanical Devices With Embedded Electro–Thermal–Compliant Actuation, MEMS–vol. 1, 1999. ADSME International Mechanical Engineering Congress and Exposition, Nashville, TN, Nov. 1999, pp. 553–560.

* cited by examiner

*Primary Examiner*—John Bastianelli

(57) ABSTRACT

A microelectromechanical device wherein the displacement of an electrothermally compliant actuator is perpendicular to a mounting substrate allowing in a first embodiment a fluid control valve to be opened and closed and in a second embodiment a plurality of electrical contacts to be opened and closed. The electrothermally compliant actuator is comprised of a pair of beam structures having a joined thick beam and then beam such that a flow of electrical current causes the beam structures to bend. A flexible isolation layer is used to thermally isolate the electrothermally compliant actuator from the fluid in another valve assembly embodiment.

25 Claims, 3 Drawing Sheets

MICROELECTROMECHANICAL DEVICE WITH PERPENDICULAR MOTION

PROVISIONAL

This application claims the benefit of the filing date of provisional applications Ser. Nos. 60/335,769 and 60/134,838, filed Dec. 5, 2001, and Jan. 15, 2002, respectively.

FIELD OF THE INVENTION

The present invention relates to microelectromechanical systems (MEMS) and more specifically to a microelectromechanical system that utilizes an electrothermally compliant (ETC) actuator to provide movement perpendicular to the base substrate.

DESCRIPTION OF THE PRIOR ART

Microelectromechanical systems (MEMS) have been developed as alternatives to conventional electromechanical devices, such as relays, actuators, valves and sensors. MEMS devices are potentially low-cost devices, due to the use of microelectronic fabrication techniques, and can be much smaller than conventional electromechanical devices.

Many applications of MEMS technology use actuators that include one or more beams that are actuated electrostatically, magnetically, thermally and/or using other forms of energy. Examples of MEMS actuators using thermal arched beam structures are described in U.S. Pat. No. 5,909,078 to Wood et. al., U.S. Pat. No. 6,367,251 also to Wood and U.S. Pat. No. 6,386,507 to Dhuler et al., the disclosures of which is hereby incorporated herein by reference. Among the arched beam structures described therein are structures including one or more arched beams that extend between paced apart supports on a microelectronic substrate and which expand and contract in response to heating and cooling, thereby causing displacement of the arched beam.

Such thermal arched beam structures can be used to provide actuators, relays, sensors, microvalves and other MEMS devices. Examples of thermal arched beam microelectromechanical devices associated fabrication methods also are described in U.S. Pat. No. 5,955,817 to Dhuler et al. entitled Thermal Arched Beam Microelectromechanical Switching Array; U.S. Pat. No. 5,962,949 to Dhuler et al. entitled Microelectromechanical Positioning Apparatus; U.S. Pat. No. 5,944,816 to Dhuler et al. entitled Thermal Arched Beam Microelectromechanical Devices and Associated Fabrication Method; U.S. Pat. No. 6,023,121 to Dhuler et al. entitled Thermal Arched Beam Microelectromechanical Structure, the disclosures of all of which are hereby incorporated herein by reference in their entirety.

Development in MEMS technology have led to actuators that offer desirable displacement and force capabilities. However, the displacement, force and/or reliability of such devices may be limited by materials and structural configuration. For example, stress generated in an arched beam actuator may limit the range of displacement and/or force over which the beam may be operated without causing permanent deformation or failure. Performance of MEMS actuators may also be limited by stability considerations. Accordingly there is an ongoing need for MEMS actuators that may provide increased stability and reliability in comparison to conventional designs.

Switches fabricated using MEMS technology normally include a substrate with one or more metal traces and control pads. A bridged beam is known to be formed over the substrate in order to form one or more contacts with one or more of the metal traces; however, with only a single throw. Such switches normally require multiple levels of metallization and have a direction of actuation parallel to the plane of the substrate.

Other examples include U.S. Pat. No. 5,955,817 to Dhuler et al. entitled "Thermal Arched Beam Microelectromechanical Valve" the disclosure of which is hereby incorporated by reference discloses an arched beam that, when heated by external electric heaters, expands to a greater arch to open a valve or perform some other actuation parallel to the substrate. Another example is U.S. Pat. No. 5,865,417 to Harris et al. the disclosure of which is hereby incorporated by reference, discloses a thin, flexible silicon membrane driven by the pressure of a fluid trapped in a cavity formed by bonding a first and second die. The cavity has a resistor formed therein through which an electrical current is driven to cause an increase in temperature of the fluid thereby causing the pressure to rise and flex the membrane. Movement of the membrane is used to drive a valve element to a position where it unblocks a port to open the valve. This invention also discloses a means to achieve a low leakage embodiment of the valve by providing a compliant material for a valve seat, which is deformed by a ridge surrounding a port in the closed position. The motion of actuation in Harris is also perpendicular to the microelectronic substrate.

Electrostatic forces are known to be used to control the opening and closing of the contacts. In particular, the control pad is connected to an external source of DC voltage. When the DC voltage is applied to the control contact, electrostatic forces cause the beam to deflect and make contact with one of the contacts, thus closing the circuit between the metal trace and the beam which define an RF contact. When the DC voltage is removed from the control pad, in some known switches, the resiliency of the beam causes it to deflect back to its normal position. In other known switches, electrostatic force is required to return the beam to the normal position. With such switches, the deflection of the beam is normally in a plane generally perpendicular to the plane of the substrate.

An electrothermally compliant (ETC) actuator is disclosed in technical papers authored by G. K. Ananthasuresh as follows: 1) Mankame, N. and Ananthasuresh, G. K., Comprehensive Thermal Modeling and Characterization of an Electro-Thermal-Compliant Microactuator, Journal of Micromechanics and Microengineering, 11, No. 5 (2001), pp. 452–462: 2) Moulton, T. and Ananthasuresh, G. K., Design and Manufacture of Electro-Thermal-Complaint Micro Devices, Sensors and Actuators, Physical, 90 (2001), pp. 3848; 3) Moulton, T. and Ananthasuresh, G. K., Micromechanical Devices with Embedded Electro-Thermal-Complaint Actuation, MEMS-Vol. 1, 1999 ADSME International Mechanical Engineering Congress and Exposition, Nashville, TN, November, 1999, pp. 553–560, the disclosures of which are hereby expressly incorporated by reference herein. The ETC actuation devices disclosed therein consist of an electrically conductive thick beam having first and second ends joined to respective ends of relatively thin beam which is also electrically conductive. As an electrical current is introduced through the device, from the first ends to the second ends, the thick beam is heated to a greater extent than the thin beam because it has a lower electrical resistance and conducts more electricity. The thick beam therefore expands to a greater extent than the thin beam expands and the actuator deflects.

SUMMARY OF THE INVENTION

According to embodiments of the present invention, an electrothermally compliant (ETC) actuator is oriented to have a direction of actuation perpendicular to the substrate it is mounted upon. The ETC deflects when an electrical current is passed simultaneously through a thick beam and an attached thin beam. In one representative embodiment the ETC actuator is used to open and close an electrical switch and in other representative embodiments the ETC actuator is used to open and close a fluid control valve.

According to one provision of the present invention, a MEMS device includes an ETC actuator is mounted to a substrate to generate movement perpendicular to that substrate.

According to another provision of the present invention, a MEMS device includes an ETC actuator is structurally connected to a fluid control valve to provide either an open or closed valve according to the presence or absence of an electrical current in the ETC actuator.

According to another provision of the present invention, an ETC actuator is formed with a relatively thick beam having respective first and second ends is attached to corresponding first and second ends of a relatively think beam which is activated when an electrical current is passed from the first end to the second end where the ETC actuator is mounted perpendicular to a substrate.

According to still another provision of the present invention, and ETC actuator is formed with a first beam having a relatively low electrical resistance having respective first and second ends attached to corresponding first and second ends of a second beam having a relatively high electrical resistance which is activated by an electrical current.

According to still another provision of the present invention, an ETC actuator seals against a sealing ring mounted to surround an outlet port until an electrical current is introduced across the ETC actuator whereupon the ETC actuator deflects (bends) to open the outlet port.

According to still another provision of the present invention, an ETC actuator is attached to a valve stem and a valve head where the valve head seals against an outlet port until an electrical current is introduced across the ETC actuator whereupon the ETC actuator deflects to move the valve stem and valve head to open the outlet port allowing a fluid to flow.

According to still another provision of the present invention, a MEMS device includes an ETC actuator having a beam structure mounted to a substrate using two compliant end supports.

According to another provision of the present invention, a MEMS device includes an ETC actuator is structurally connected to an electrical switch to provide electrical connection and disconnection according to the presence or absence of an electrical current in the ETC actuator.

DETAILED DESCRIPTION OF THE INVENTION

Figure 1:
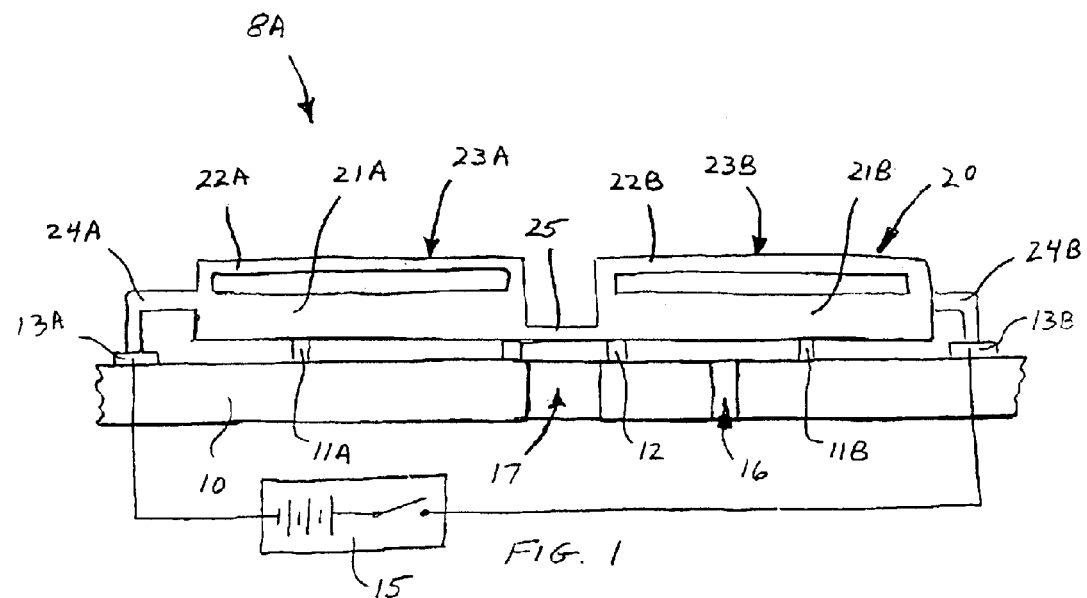
FIG. 1 is a cross-sectional view of a first embodiment of the MEMS valve assembly of the present invention in a closed position.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough an complete, and will fully convey the scope of the invention to those skilled in the art. In the drawings, thickness, displacements and other features may be exaggerated for clarity. Like numbers refer to like elements throughout. It will be understood that when an element such as a layer, region or substrate is referred to as being "on", "connected to" or "coupled to" another element, it can be directly on, directly connected to or directly coupled to the other element, or intervening elements also may be present. In contrast, when an element is referred to as being "directly on," "directly connected to" or "directly coupled to" another element, there are no intervening elements present.

Certain terminology will be used in the following description for convenience in reference only and will not be limited. The terms "rightward" and "leftward" will refer to direction in the drawings in connection with which the terminology is used. The terms "inwardly" and "outwardly" will refer to directions toward and away from, respectively, the geometric center of the apparatus. The terms "upward" and "downward" will refer to directions as taken in the drawings in connection with which the terminology is used. All foregoing terms mentioned above include the normal derivatives and equivalents thereof.

Now referring to FIG. 1 of the drawings, a cross-sectional view of a first embodiment of the MEMS valve assembly 8 of the present invention is shown. In general, the elements described herein can be fabricated by doping silicon on metalization of the silicon using conventional microelectronic fabrication techniquest. An electrothermally compliant (ETC) actuator 20 is mounted on a microelectronic substrate 10 using supports 11A, 11B. The ETC actuator 20 is bonded to the supports 11A, 11B and the supports are bonded to the substrate 10. The supports 11A and 11B and electrical connectors 24A and 24B are somewhat compliant to allow the ETC actuator 20 to deflect to a slight extent in response to an electrical current which is passed therethrough. An outlet port 17 is formed in the substrate 10 which is sealed against the ETC actuator 20 when in a non-activated state through contact of a ring 12 which is shown as circular in shape but can be any suitable shape to provide the sealing function.

Electrical connectors 24 are connected to a switchable source of electrical current 15 where the electrical current is introduced at contacts 13A and 13B such that electrical energy can be made to flow through the electrical connectors 24A, 24B into the ETC actuator 20.

The ETC actuator 20 is comprised of two beam structures 23A and 23B which are electrically and mechanically joined by bridge section 25. Beam structure 23A is comprised of a relatively thin beam 22A attached at each end to a relatively thick beam 21A. And likewise, beam structure 23B is comprised of a relatively thin beam 22B attached at each end to a relatively thick beam 21B. As electrical current flows through each beam structure 23A, 23B, the thick beams 21A, 21B have lower electrical resistance as compared to their respective thin beams 22A, 22B due to their difference in cross-sectional area and therefore the thick beams 21A, 21B expand at a faster rate than their respective thin beams 22A, 22B. This causes the beam structure to bend into a position shown in FIG. 2. In an alternative method of creating a difference in electrical resistance between the beams 21A, 21B and 22A, 22B respectively, doping of the silicon material can be used.

In FIG. 1, the outlet port 17 is closed when the bridge section 25 contacts and seals against the ring 12 thereby shutting off the fluid flow 18 from passing from the inlet port 16 to the outlet port 17. The position of the bridge section 25 relative to the ring 18 can be modulated using pulse wave modulation of the electrical current supply 15 thereby controlling the temperature difference between the thick beams 21A, 21B relative to the temperature of the thin beams 23A, 23B.

Figure 2:
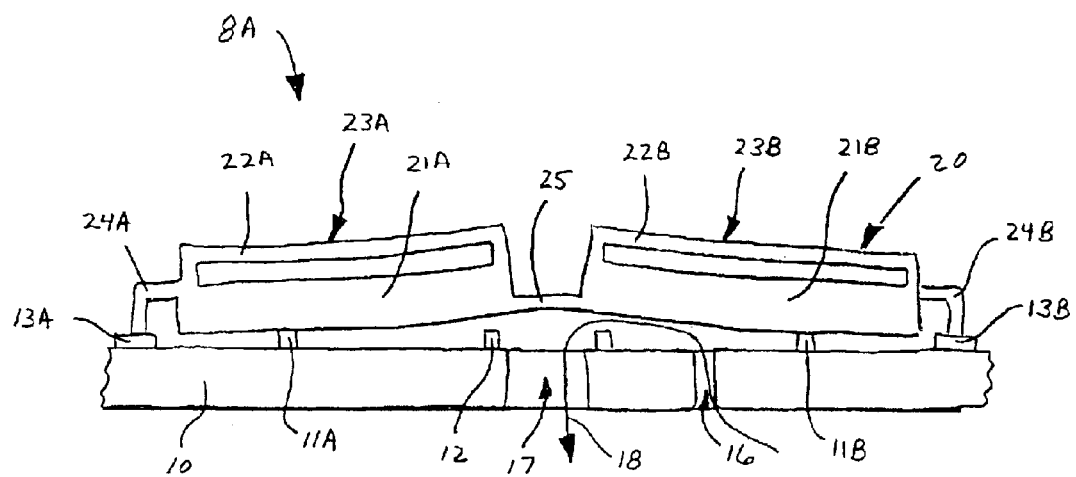
FIG. 2 is a cross-sectional view of the MEMS valve assembly of FIG. 1 in an open position.

Now referring in detail to FIG. 2 which is a cross-sectional view of the MEMS valve assembly 8A of FIG. 1 in an open activated state, an electrothermally compliant (ETC) actuator 20 is mounted on a microelectronic substrate 10 using supports 11A, 11B. The supports 11A and 11B are sufficiently compliant to allow the ETC actuator 20 to deflect in response to an electrical current which is passed therethrough. An outlet port 17 is formed in the substrate 10 which is sealed against the ETC actuator 20 when in a non-activated state through contact with a ring 12 which is shown as circular in shape but can be any suitable shape to provide the sealing function.

Now referring in detail to FIG. 2, electrical current supply 15 is electrically connected to the contacts 13 for introduction into the ETC actuator 20 through the electrical connectors 24. The ETC actuator 20 is shown in an activated state when the beam structures 23A and 23B are deflected due to the difference in thickness between the thick beams 21A, 21B and the thin beams 22A, 22B. The thick beams 21A, 21B expand to a greater extent than the thin beams because they conduct more electrical current and therefore are heated to a higher temperature than the thin beams 22A, 22B which have a higher electrical resistance and conduct a lower level of electrical energy. Again, selective doping of the silicon material can be used to create a difference in electrical resistance of the beams rather than a difference in thickness or in combination therewith.

The valve is formed by the ring 12 which is formed on the surface of the substrate 10 which is covered and uncovered by the bridge section 25. The bridge section 25 structurally connects the first beam structures 23A, 23B and seals against the ring 12 when the electrical supply 15 is not connected to supply electrical current through the contacts 13A, 13B and connectors 24A, 24B into and through the first and second beam sections 23A, 23B respectively and the bridge section 25. The fluid flow 18 to be controlled by the ETC valve assembly 8A enters inlet port 16 formed in the substrate 10 and is controlled by the position of the bridge section 25. If the bridge section 25 is pulled away from the ring 12 as the ETC actuator is activated, then the fluid flow 18 passes into the outlet port 17 as shown in FIG. 2.

Figure 3:
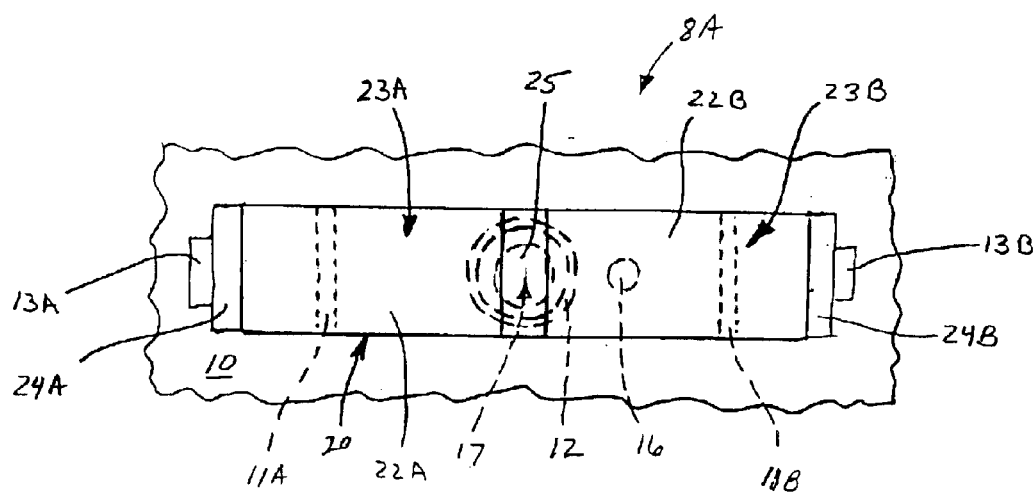
FIG. 3 is a top view of the first embodiment of the MEMS valve assembly of the present invention.

Now referring to FIG. 3, a top view of the MEMS valve assembly 8A of the present invention is shown. The ETC actuator 20 is shown as rectangular in shape but is contemplated as being configured in any functional shape to meet performance requirements.

An electrothermally compliant (ETC) actuator 20 is mounted on a microelectronic substrate 10 using supports 11A, 11B and ring 12. The support 11A and 11B and ring 12 are sufficiently compliant to allow the ETC actuator 20 to deflect in response to an electrical current which is passed therethrough. An outlet port 17 is formed in the substrate 10 which is sealed against the ETC actuator 20 when in a non-activated state through contact of a ring 12 which is shown as circular in shape but can be any suitable shape to provide the sealing function.

Electrical connectors 24 are connected to a source of electrical current can be introduced at contacts 13 such that electrical energy can be made to flow through the ETC actuator 20.

The ETC actuator 20 is comprised of two beam structures 23A and 23B which are electrically and mechanically joined by bridge section 25. Beam structure 23A is comprised of a relatively thin beam 22A attached at each end to a relatively thick beam 21A. And likewise, beam structure 23B is comprised of a relatively thin beam 22B attached at each end to a relatively thick beam 21B. As electrical current flows through each beam structure 23A, 23B, the thick beams 21A, 21B have lower electrical resistance as compared to their respective thin beams 22A, 22B and therefore the thick beam 21A, 21B expand at a faster rate than the thin beam 22A, 22B. This causes the beam structure to bend into a position shown in FIG. 2.

Figure 4:
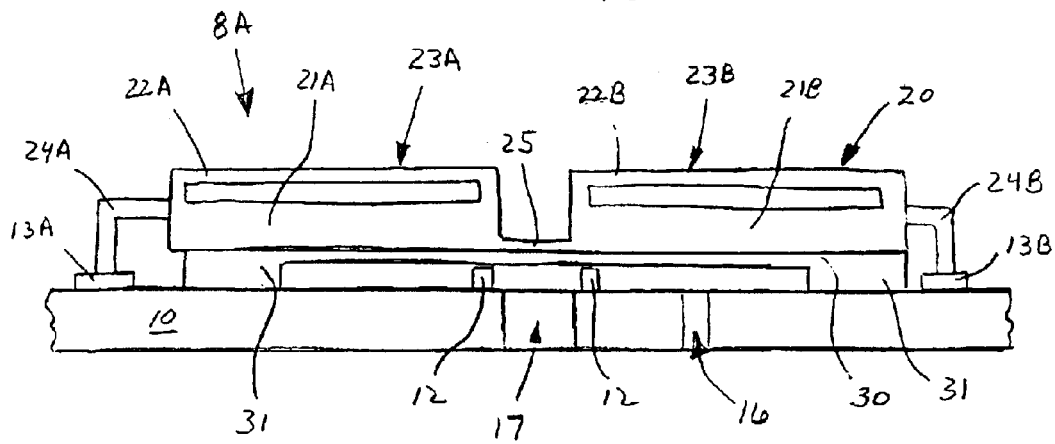
FIG. 4 is a cross-sectional view of a second embodiment of the MEMS valve assembly of the present invention.

Now referring to FIG. 4, an alternate embodiment of the MEMS valve assembly 8 of the present invention is shown. A flexible isolation layer 30 has been bonded to the underside of the first and second beam structures 23A, 23B and the bridge section 25 to isolate the beam structures 23A, 23B from the fluid whose flow is being controlled by the MEMS value assembly. This limits the thermal exchange between the elements so that the fluid is not heated by the ETC actuator 20 and the ETC actuator 20 is not cooled by the fluid. Thus, the insulation layer 30 contacts and seals against the outlet port 17 when the ETC actuator 20 is not actuated as shown in FIG. 4 and then is displaced upward when the ETC actuator is energized and the outlet port 17 is opened and fluid flow from the inlet port 16 through the outlet port 17 as shown by the fluid flow 18 arrows 18A and 18B.

Microelectromechanical (MEM) structures such as those of the present invention requires microfabrication techniques. In general, semiconductor batch fabrication techniques are employed to achieve what is in effect three dimensional machining of single crystal and polycrystalline silicon and silicon variants and multiple metal layers. Multiple layer processes are known in the art and have been highly developed to five or more layers of fabrication on top of a silicon base structure. Such a fabrication method is disclosed in U.S. Pat. No. 6,188,301 which is hereby incorporated by reference.

Another example of known fabrication techniques can be found in U.S. Pat. No. 6,069,540 the disclosure of which is hereby incorporated by reference. These fabrication methods can be used along with other methods known in the art, some of which are referred in these patents, to fabricate the structures of the present invention. The reference book entitled: *Micromachined Transducers Sourcebook*, G. T. A. Kovacs, WBC McGraw-Hill, 1998.

Figure 5:
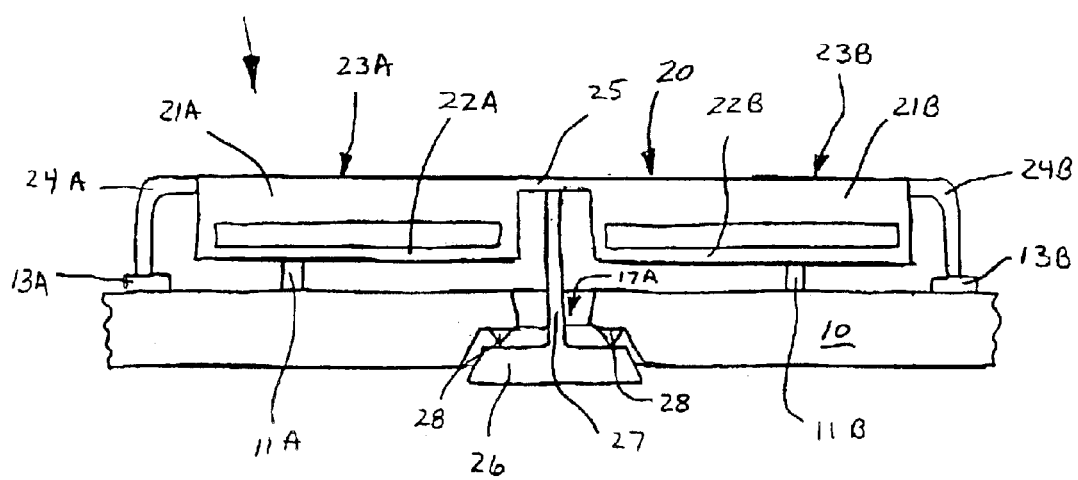
FIG. 5 is a cross-sectional view of a third embodiment of the MEMS valve assembly of the present invention in a closed position.
Figure 6:
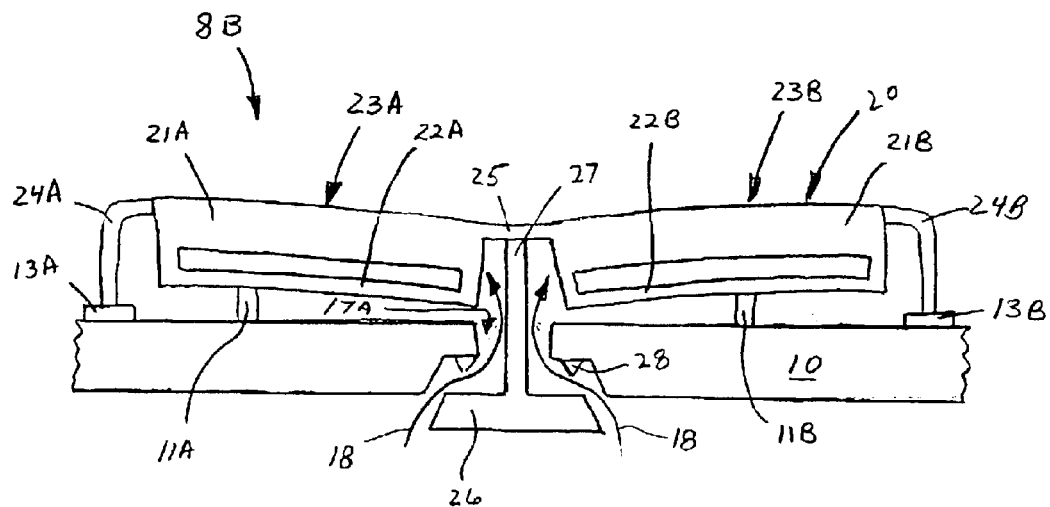
FIG. 6 is a cross-sectional view of the MEMS valve assembly of FIG. 5 in an open position.

Referring to FIGS. 5 and 6a cross-sectional view of a second alternative embodiment of the MEMS valve assembly 8B of the present invention is shown. Beam structures 23A and 23B are joined with bridge section 25 where a valve stem 27 is attached to a valve head 26. The circular valve head 26 can contact and seal against sealing ring 28 as shown in FIG. 5 when the ETC actuator 20 is not energized thereby preventing the flow of a fluid through the port 17A. Conversely, when the ETC actuator 20 is energized as shown in FIG. 6, the bridge section 25 is displaced downward toward the substrate 10 thereby moving the valve stem 27 and necessarily the valve head 26 downward thereby opening the port 17A allowing the fluid flow 18 to occur flowing as shown from the bottom side of the substrate 10 to the top side of the substrate 10. The advantage of this configuration is that the fluid pressure will tend to hold the valve head 26 against the sealing ring 28 thereby preventing leakage when the valve assembly 8B is closed.

When the electrical current supply 15 is not electrically connected to the ETC actuator 20, the ETC actuator 20 reverts back to the state shown in FIG. 5 and the valve head 26 once again seals against the sealing ring 28.

Figure 7:
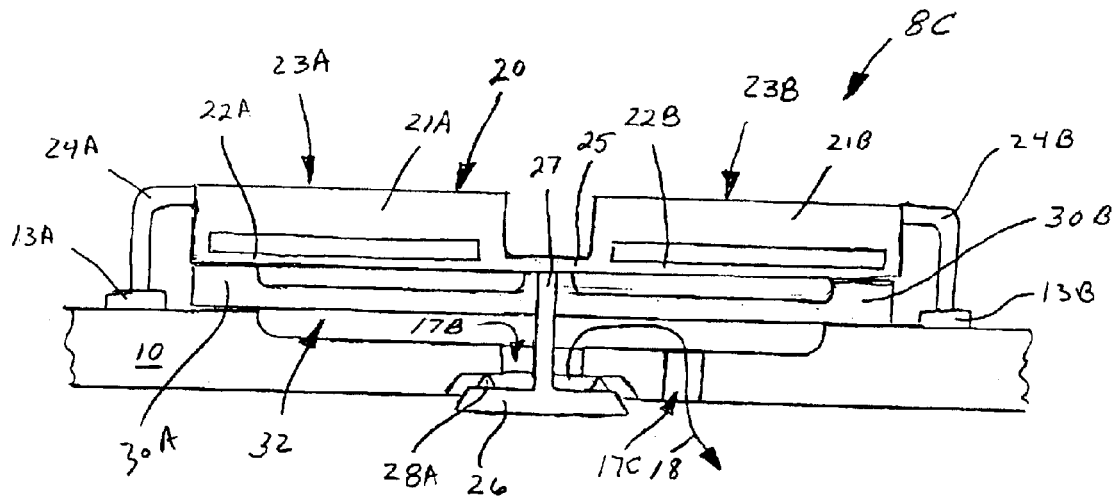
FIG. 7 is a cross-sectional view of a fourth embodiment of the MEMS valve assembly of the present invention.

Now referring to FIG. 7, a cross-sectional view of an alternate embodiment of the MEMS valve assembly of FIGS. 5 and 6 of the present invention is shown. The valve assembly 8C has been modified primarily with the addition of a flexible insulation layer 30A which functions to thermally and chemically isolate the ETC actuator 20 from the fluid being controlled. This prevents the fluid from being heated when electrical current is supplied across the contacts 13A and 13B. The isolation layer 30A also functions to minimize heat transfer to the fluid flow 18 thereby cooling the ETC actuator 20 and degrading its performance.

In this embodiment, an outlet port 17C is formed in the substrate 10 so that the flow of the fluid indicated by 18 starts on the bottom side of the substrate 10, flows up the inlet port 17B into the cavity 32 and then down through the outlet port 17C. Note that the outlet port 17C must be separated from the inlet fluid flow in some manner. Since the valve head 26 is sealed against the substrate 10 through the sealing ring 28A, the fluid flow is stopped. Unlike FIGS. 5 and 6, in this embodiment the sealing ring 28A is attached to the valve head 26. Similar to that illustrated in FIG. 6, when the ETC actuator 20 is energized by introducing an electrical current across contacts 13A and 13B, the beam structure, 23A, 23B deflect and push the valve stem 37 and valve head 26 downward thereby opening the bridge section 25 which moves downward by the bending of the first and second beam structures 23A, 23B. The sealing ring 28A mounted on the valve head 26 (could be mounted on the substrate 10) separates from the substrate 10 and opens the inlet port 17B to allow the passage of the fluid to the top side of the substrate 10 into the cavity 32 then into the outlet port 17C. The outlet flow of the fluid must be separated from the inlet flow on the underside of the substrate 10.

The compliant thermal insulation layer is disposed between the substrate 10 and the bottom side of the beam structures 23A, 23B and the bridge section 25. The end portions 30A, 30B sit on the substrate 10 and support the ETC actuator 20 thereon.

Figure 8:
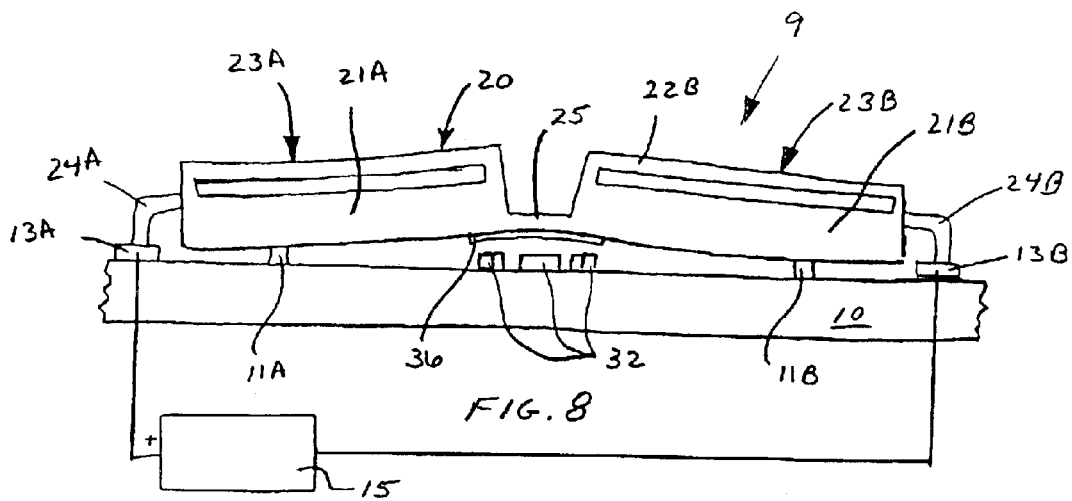
FIG. 8 is a cross-sectional view of a MEMS electrical switch of the present invention in an open position.

Now referring to FIG. 8, a cross-sectional view of a MEMS electrical switch 9 of the present invention is shown in an open position with the ETC actuator 20 energized. An electrical current supply 15 is electrically connected across the contacts 13A, 13B for introduction into the ETC actuator 20 through the electrical connectors 24A, 24B. The ETC actuator 20 is shown in an activated state when the beam structures 23A and 23B are deflected due to the difference in thickness between the thick beams 21A, 21B and the thin beams 22A, 22B. The thick beams 21A, 21B expand to a greater extent than the thin beams because they conduct more electrical current and therefore are heated to a higher temperature than the thin beams 22A, 22B which have a higher electrical resistance and conduct a lower level of electrical energy.

The electrothermally compliant ETC actuator 20 is mounted on a microelectronic substrate 10 using supports 11A, 11B. The supports 11A and 11B are sufficiently compliant to allow the ETC actuator 20 to deflect in response to an electrical current which is passed therethrough. A conductive layer 36 is attached to the bottom surface of the bridge section 25 and portions of the first and second beam structures 23A, 23B. However, the conductive layer 36 is electrically isolated from the bridge section 25 and the first and second beam structures 23A, 23B. When the ETC actuator 20 is not energized, the conductive layer 36 contacts the segmented electrical contacts 32 thereby completing the electrical circuit.

Segmented electrical contacts 32 are mounted on the substrate 10 and are shown in an electrically open position where electrical contact is not made with the bridge section 25 and portions of the first beam structure 23A and the second beam structure 23B which are electronically conductive in the region which makes contact with the segmented electrical contacts 32. Metallized conductive strips (not shown) connect the segmented electrical contacts 32 to other electrical circuits.

A number of MEMS devices of the present invention have also been envisioned that utilize a plurality of MEMS actuators of the present invention acting in parallel for providing large forces and displacements while consuming reasonable amounts of electrical power. For example, a large number of parallel acting MEMS valve assemblies of the present invention could be selectively activated to provide a selectable fluid flow volume as an alternative to pulse width modulation.

Means of fabrication of the actuator of this invention are well known in the art. For example, the fabrication facilities of Sandia National Laboratories in New Mexico have a suitable multi-layer process which is capable of fabricating this type of device. Fusion bonding can be used to bond the narrow beam to the wide beam and to join the top of the valve stem to the bridge section 25.

Details of processes that may be used to fabricate portions of embodiments of integrated valve structures is generally known to those of ordinary skill in the art. In addition, the "Zdeblick" patents (U.S. Pat. Nos. 4,821,997 and 4,824,073 and 4,943,032 and 4,966,646), all of which are incorporated by reference herein, provide processing descriptions. Thus, only some processing details, believed not readily apparent are described herein.

Embodiments of the present invention will be described with reference to the aforementioned figures. These drawings are simplified for ease of understanding and description of embodiments of the present invention only. Various modifications or adaptions of the specific methods and/or structures that represent embodiments of the present invention may become apparent to those skilled in the art as these embodiments are described. All such modifications, adaptations or variations that rely upon the teachings have advanced the art, are considered to be within the spirit and scope of the present invention. For example, in some embodiments of the present invention, a valve with a single valve port is employed whereas it is contemplated that other embodiments with multiple valve ports can be employed.

What is claimed is:

1. A MEMS valve assembly comprising:

a substrate;

an electrothermally compliant actuator mounted to said substrate where said electrothermally compliant actuator has upon activation a direction of motion perpendicular to said substrate to open and close a fluid controlling valve; a fluid outlet port, said outlet poll being configured to be opened or closed upon activation of said electrothermally compliant actuators; and wherein said electrothermally compliant actuator is comprised of a first beam structure, said first beam structure having a relatively thick beam joined to a relatively thin beam, said first beam structure connected to a second beam structure, said second beam structure having a relatively thick beam joined to a relatively thin beam, where said first and second beam structures deflect in a direction perpendicular to said substrate upon introduction of an electrical current through said first and second beam structures.

2. The MEMS valve assembly of claim 1, further comprising a first electrical connector attached to said first beam structure and a second electrical connector attached to said second beam structure.

3. The MEMS valve assembly of claim 2, further comprising a first contact attached to said first electrical connector and mounted to said substrate and a second contact attached to said second-electrical connector and mounted to said substrate where a source of electrical current is connected to said first and second connectors.

4. The MEMS valve assembly of claim 1, wherein said first beam structure is joined to said second beam structure with a bridge section.

5. The MEMS valve assembly of claim 1, wherein said first beam structure is mounted to said substrate using a first support and where said second beam structure is mounted to said substrate using a second support.

6. The MEMS valve assembly of claim 1, further comprising a flexible insulation layer attached to said first and second beam structures to thermally insulate said electrothermally compliant actuator from said fluid.

7. The MEMS valve assembly of claim 1, further comprising a first support for mounting said first beam structure to said substrate and second support for mounting said second beam structure to said substrate.

8. The MEMS valve assembly of claim 1, further comprising a fluid outlet port, said outlet port being opened or closed upon the introduction of electrical current into said electrothermally compliant actuator.

9. The MEMS valve assembly of claim 8, further comprising a fluid inlet port formed in said substrate, said inlet port allowing fluid to pass from one side of said substrate to an opposite side of said substrate.

10. The MEMS valve assembly of claim 8, wherein said outlet port is formed in said substrate, said outlet port when opened by said electrothermally compliant actuator allowing fluid to flow from one side of said substrate to an opposite side of said substrate.

11. The MEMS valve assembly of claim 10, wherein said inlet port and said outlet port are circular in cross-section.

12. The MEMS valve assembly of claim 10, further comprising a ring mounted adjacent to said outlet port, said ring contacting said electrothermally compliant actuator to seal said fluid from entering said outlet port.

13. A MEMS electrical switch comprising:

a substrate;

an electrothermally compliant actuator mounted to said substrate wherein said electrothermally compliant actuator has upon actuation a direction of motion perpendicular to said substrate to open or close a plurality of electrical contacts wherein said electrothermally compliant actuator is comprised of a first beam structure, said first beam structure having a relatively thick beam joined to a relatively thin beam, said first beam structure connected to a second beam structure, said second beam structure having a relatively thick beam joined to a relatively thin beam, where said first and second beam structures deflect in a direction perpendicular to said substrate upon introduction of an electrical current through said first and second beam structure.

14. The MEMS electrical switch of claim 13, further comprising a plurality of electrical contact segments mounted to said substrate between said substrate and said electrothermally compliant actuator such that said electrothermally compliant actuator electrically opens or closes said contact segments.

15. A MEMS electrical switch of claim 13, further comprising a bridge section joining said first beam structure to said second beam structure.

16. A MEMS electrical switch of claim 13, further comprising a first support for mounting said first beam structure to said substrate and a second support for mounting said second beam structure to said substrate.

17. The MEMS valve assembly of claim 13, further comprising a valve stem attached to said electrothermally compliant actuator and a valve head attached to said valve stem where said valve head seals against said substrate to stop the flow of said fluid.

18. The MEMS valve assembly of claim 17, further comprising a sealing ring attached to said substrate, said valve head contacting said sealing ring to stop the flow of said fluid.

19. The MEMS valve assembly of claim 17, further comprising a fluid outlet port where said valve head seals said outlet port.

20. The MEMS valve assembly of claim 17, further comprising a flexible isolation layer disposed between said electrothermally compliant actuator and said substrate.

21. The MEMS valve assembly of claim 17, further comprising a flexible isolation layer disposed on said first and second beam structure and disposed between said electrothermally compliant actuator and said substrate.

22. The MEMS valve assembly of claim 21, wherein said electrothermally compliant actuator is attached to said isolation layer and said isolation layer is attached to said substrate.

23. The MEMS valve assembly of claim 22, further comprising a sealing ring mounted to said valve head or said substrate for sealing said valve head to said substrate.

24. The MEMS valve assembly of claim 22, further comprising a cavity formed in said substrate and disposed between said substrate and said isolation layer.

25. The MEMS valve assembly of claim 24, further comprising an inlet port formed in said substrate for allowing fluid flow between one side of said substrate and an opposite side of said substrate.

* * * * *